United States Patent
Shirozono et al.

(10) Patent No.: US 10,532,769 B2
(45) Date of Patent: Jan. 14, 2020

(54) VEHICLE STEERING SYSTEM AND LANE KEEPING SYSTEM

(71) Applicant: Mitsubishi Electric Corporation, Tokyo (JP)

(72) Inventors: Masataka Shirozono, Tokyo (JP); Shunsuke Nakajima, Tokyo (JP); Yasuyoshi Hori, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 77 days.

(21) Appl. No.: 15/826,901

(22) Filed: Nov. 30, 2017

(65) Prior Publication Data
US 2018/0170431 A1    Jun. 21, 2018

(30) Foreign Application Priority Data
Dec. 21, 2016   (JP) .................................. 2016-247709

(51) Int. Cl.
*B62D 15/02*       (2006.01)
*B60W 30/12*       (2006.01)

(52) U.S. Cl.
CPC .......... *B62D 15/025* (2013.01); *B60W 30/12* (2013.01)

(58) Field of Classification Search
CPC ............................ B62D 15/025; B60W 30/12
See application file for complete search history.

(56) References Cited

U.S. PATENT DOCUMENTS

| 6,263,270 B1 | 7/2001 | Sato et al. |
| 8,406,957 B2 * | 3/2013 | Kim .................... B62D 15/025 701/41 |
| 9,227,663 B2 | 1/2016 | Matsuno |
| 2008/0091320 A1 * | 4/2008 | Sakai .................... B62D 1/286 701/42 |

(Continued)

FOREIGN PATENT DOCUMENTS

| CN | 103419783 A | 12/2013 |
| JP | 10-152063 A | 6/1998 |

(Continued)

OTHER PUBLICATIONS

Communication dated Nov. 21, 2017 from the Japanese Patent Office in counterpart application No. 2016-247709.

(Continued)

*Primary Examiner* — Michael J Zanelli
(74) *Attorney, Agent, or Firm* — Sughrue Mion, PLLC; Richard C. Turner

(57) ABSTRACT

A vehicle steering system includes: a steering input unit that is steered by a driver; a steering force detector to detect steering force input into the steering input unit; a first steering control amount calculator to calculate a first steering control amount for bringing the vehicle close to the target traveling line; a steering control amount correction coefficient calculator to calculate a steering control amount correction coefficient for correcting a steering control amount based on the steering force; a second steering control amount calculator to calculate a second steering control amount based on the first steering control amount and the steering control amount correction coefficient; and a steering controller that steers and controls the vehicle based on the second steering control amount.

13 Claims, 11 Drawing Sheets

(56) References Cited

U.S. PATENT DOCUMENTS

2013/0317698 A1   11/2013  Yoon et al.
2017/0217477 A1*  8/2017  Akatsuka ............. B62D 5/0463

FOREIGN PATENT DOCUMENTS

| JP | 11-78936 A | 3/1999 |
| --- | --- | --- |
| JP | 11-78940 A | 3/1999 |
| JP | 2004-352001 A | 12/2004 |
| JP | 2005-067484 A | 3/2005 |
| JP | 2006-117181 A | 5/2006 |
| JP | 2015-013545 A | 1/2015 |
| JP | 2015-033942 A | 2/2015 |

OTHER PUBLICATIONS

Communication dated Oct. 11, 2019, from State Intellectual Property Office of People's Republic of China, in counterpart Application No. 201711307291.9, 15 pages total with translation English Translation.

* cited by examiner

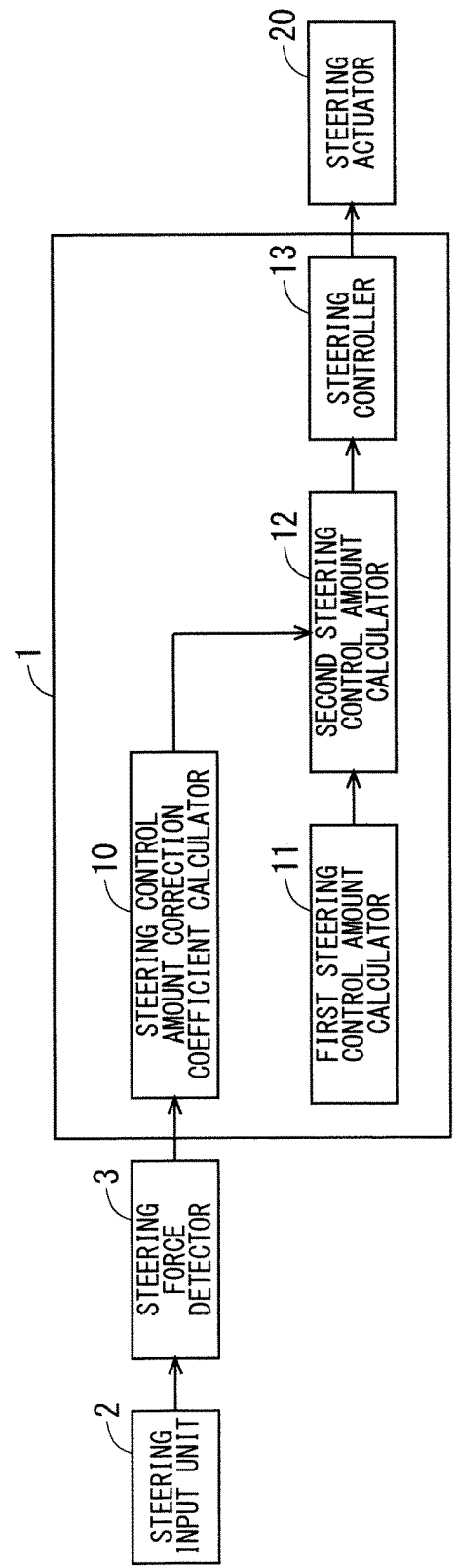

F I G. 8
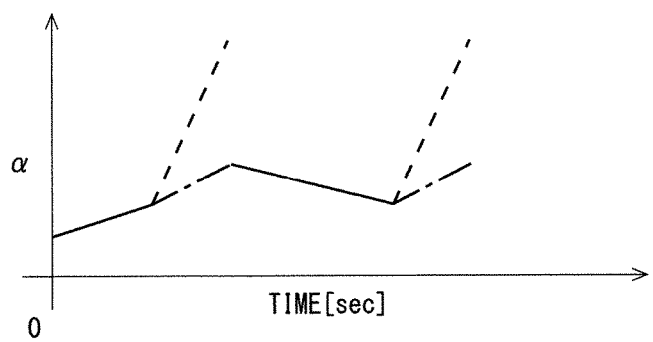
F I G 9
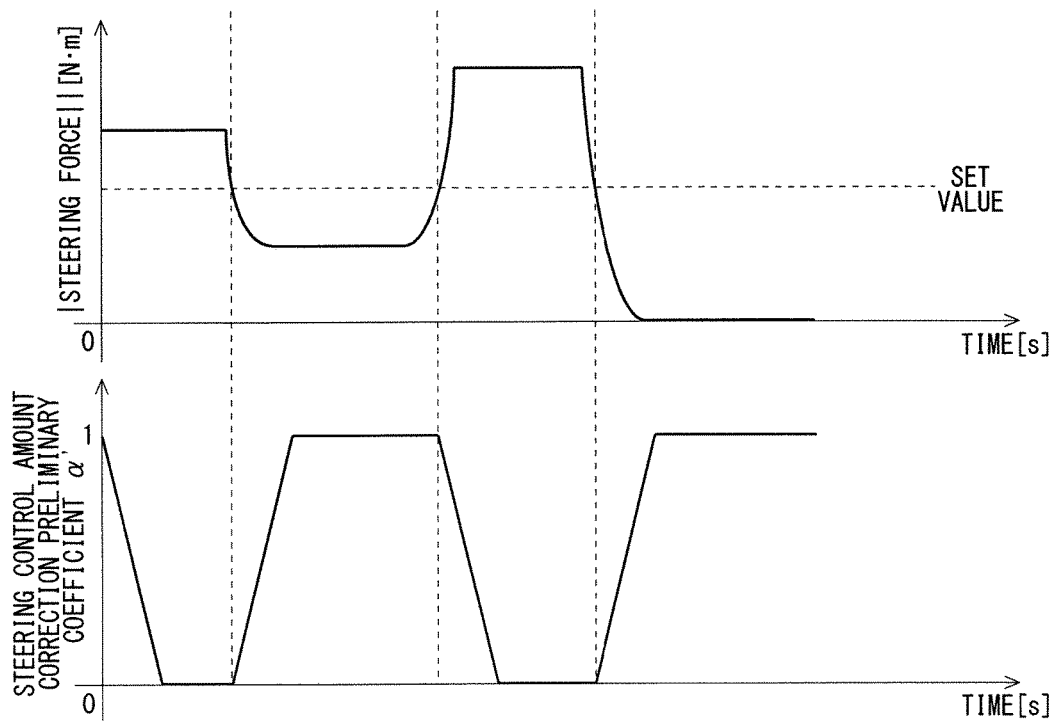

F I G . 1 0
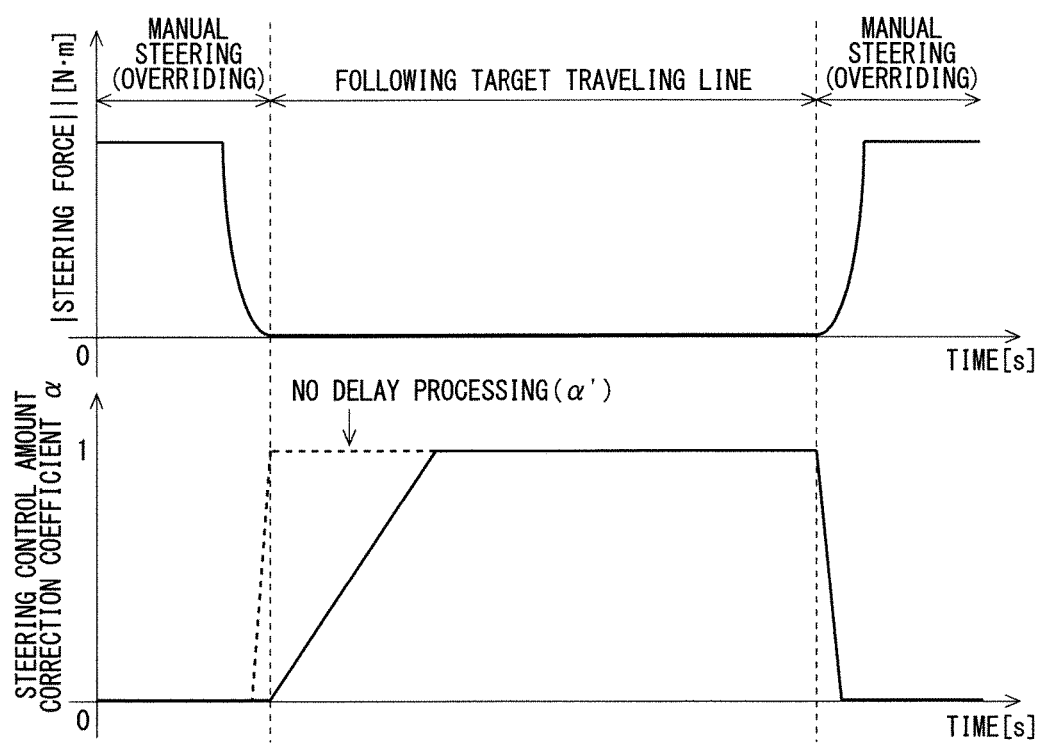

VEHICLE STEERING SYSTEM AND LANE KEEPING SYSTEM

BACKGROUND OF THE INVENTION

Field of the Invention

The present invention relates to a vehicle steering system, and particularly relates to a vehicle steering system for assisting steering of a steering wheel such that a vehicle travels following a desired target traveling line.

Description of the Background Art

There has hitherto been known a technique of assisting steering of a steering wheel or performing automatic steering such that a vehicle travels following a desired target traveling line.

For example, as disclosed in Japanese Patent Application Laid-Open No. 2015-13545, there is a technique of recognizing a white line on a road by using a camera attached to the front of a vehicle, to perform steering control such that the vehicle travels at the center of a lane. This is called a lane keeping system.

Further, as disclosed in Japanese Patent Application Laid-Open No. 2005-67484, there is a technique of calculating a target trajectory by obtaining a subject vehicle position, a target point preset by the driver, map data, and the like based on satellite information, to perform steering control such that the vehicle follows the target trajectory.

However, in the conventional techniques disclosed in Japanese Patent Application Laid-Open Nos. 2015-13545 and 2005-67484, when the driver deviates from the target traveling line and performs steering intervention, i.e., so-called override, in which the driver operates the steering wheel so as to avoid other vehicles, obstacles, and the like on the target traveling line, large steering assist force is instantaneously generated for canceling the deviation from the target traveling line due to the override, and interferes with the driver's steering intervention, thereby causing a problem that the operation of avoiding other vehicles, obstacles, and the like is inhibited.

In contrast, for example, Japanese Patent Application Laid-Open No. 10-152063 (1998) discloses a technique of detecting the driver's steering intervention from steering force which is the steering state of the steering wheel, to make corrections so as to reduce a control amount of the lane keeping system.

Moreover, Japanese Patent Application Laid-Open No. 2015-33942 discloses a technique of calculating a risk level based on information relating to the safety of traveling, acquired from a known in-vehicle control system and vehicle-mounted sensor such as the driver's steering intervention, a stop control execution request flag by a PCS (pre-crash system), rain determination by a rain sensor, and brightness determination by an illuminance sensor, to make corrections so as to reduce a control amount of the lane keeping system in accordance with the risk level.

In Japanese Patent Application Laid-Open Nos. 10-152063 (1998) and 2015-33942, a correction coefficient of the steering control amount of the lane keeping system, which is a vehicle steering device, is calculated based on a steering angle being the steering state of the steering wheel or an instantaneous value of steering torque by using a map or a table, to make corrections so as to reduce the control amount when the driver performs override. However, after the decrease in the control amount due to the driver's steering intervention and immediately after completion of the steering intervention, that is, immediately after completion of the override, the control amount abruptly increases, thereby causing a problem that, in some cases, the vehicle fluctuates at the time of control-switching and smooth control-switching cannot be performed.

SUMMARY OF THE INVENTION

Provided is a vehicle steering system that achieves smooth control-switching when the state is returned to a target traveling line following control state after completion of the driver's override.

A vehicle steering system according to the present invention includes: a steering input unit that is steered by a driver; a steering force detector to detect steering force input into the steering input unit; a first steering control amount calculator to calculate a first steering control amount for bringing the vehicle close to the target traveling line; a steering control amount correction coefficient calculator to calculate a steering control amount correction coefficient for correcting a steering control amount based on the steering force; a second steering control amount calculator to calculate a second steering control amount based on the first steering control amount and the steering control amount correction coefficient; and a steering controller to steer and controls the vehicle based on the second steering control amount. The steering control amount correction coefficient calculator sets the steering control amount correction coefficient to a coefficient that decreases with increase in the steering force and increases with decrease in the steering force, and calculates the steering control amount correction coefficient such that a time rate of change in the steering control amount correction coefficient during the increase is smaller than a time rate of change during the decrease.

According to the above vehicle steering system, even after a decrease in the steering control amount due to the driver's steering intervention and immediately after completion of the steering intervention, that is, immediately after completion of the override, the steering control amount does not abruptly increase and it is possible to smoothly return the state to the target traveling line following control state.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a functional block diagram illustrating a vehicle steering system of a first preferred embodiment according to the present invention;

FIG. 8 is a diagram for describing the delay processing by rate limiter processing;

FIG. 9 is a diagram for describing calculation based on an increase/decrease amount of the steering control amount correction coefficient with elapse of time;

FIG. 10 is a diagram illustrating time changes in the steering control amount correction coefficient and the absolute value of steering force;

DESCRIPTION OF THE PREFERRED EMBODIMENTS

Figure 2:
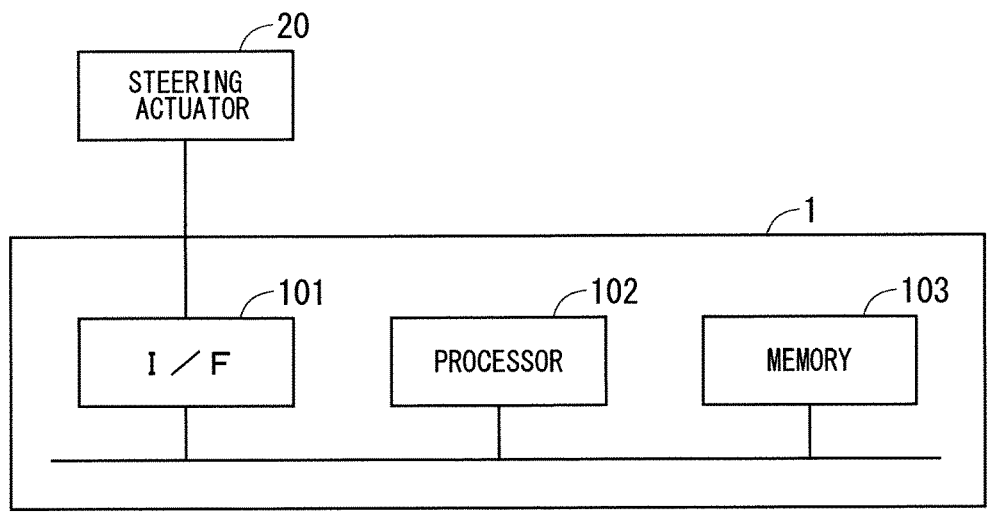
FIG. 2 is a diagram illustrating a hardware configuration of a vehicle steering system of the first preferred embodiment according to the present invention.

Hereinafter, a vehicle steering system according to the present invention will be described with reference to the drawings in accordance with each preferred embodiment. In each preferred embodiment, the same or corresponding parts are denoted by the same reference numerals, and duplicate description is omitted.

<First Preferred Embodiment>

FIG. 1 is a functional block diagram illustrating a configuration of a vehicle steering system 100 of a first preferred embodiment according to the present invention. As illustrated in FIG. 1, a vehicle steering system 100 includes a vehicle steering device 1 (hereinafter may be referred to as "steering device 1"), a steering input unit 2, steering force detector 3, and a steering actuator 20. In the following description, a vehicle mounted with the steering device 1 will be referred to as a "subject vehicle".

The steering input unit 2 is a steering wheel with which the driver steers the vehicle. Note that the steering input unit 2 may be a joystick for steering the vehicle or switches for selecting the steering, and its format is not limited.

The steering force detector 3 is, for example, a torque sensor, connected to the steering input unit 2, detects steering force which is an amount of operation on the steering input unit 2 by the driver, and transmits the steering force to the steering device 1.

As illustrated in FIG. 1, the steering device 1 includes a steering control amount correction coefficient calculator 10, a first steering control amount calculator 11, a second steering control amount calculator 12, and a steering controller 13, and the steering force detected by the steering force detector 3 is input into the steering control amount correction coefficient calculator 10.

The steering control amount correction coefficient calculator 10 calculates the steering control amount correction coefficient a based on the input steering force and inputs the steering control amount correction coefficient a into the second steering control amount calculator 12.

The first steering control amount calculator 11 calculates a first steering control amount and outputs the first steering control amount to the second steering control amount calculator 12.

The second steering control amount calculator 12 multiplies the steering control amount correction coefficient a input from the steering control amount correction coefficient calculator 10 with the first steering control amount input from the first steering control amount calculator 11, to calculate a second steering control amount, and inputs the second steering control amount into the steering controller 13.

The steering controller 13 causes the steering actuator 20 to generate turning power based on the second steering control amount input from the second steering control amount calculator 12, to perform steering control on the steering wheels of the subject vehicle. The steering controller 13 also includes a hydraulic power steering or an electric power steering as a function to assist the steering force of the driver. However, the description thereof is omitted in the present preferred embodiment.

FIG. 2 illustrates a hardware configuration in a case where each block of the steering device 1 illustrated in FIG. 1 (the steering control amount correction coefficient calculator 10, the first steering control amount calculator 11, the second steering control amount calculator 12, the steering controller 13) is configured using a processor such as a CPU (Central Processing Unit), a DSP (Digital Signal Processor), or the like. In this case, the function of each block of the steering device 1 is achieved by a combination with software (software, firmware, or software and firmware). Software and the like are described as programs and stored into memory 103 (storage device).

An interface (I/F) 101 performs input/output control of a signal to/from an external device such as the steering force detector 3. Note that FIG. 2 only illustrates a configuration in which the steering actuator 20 is connected via the I/F 101.

Figure 3:
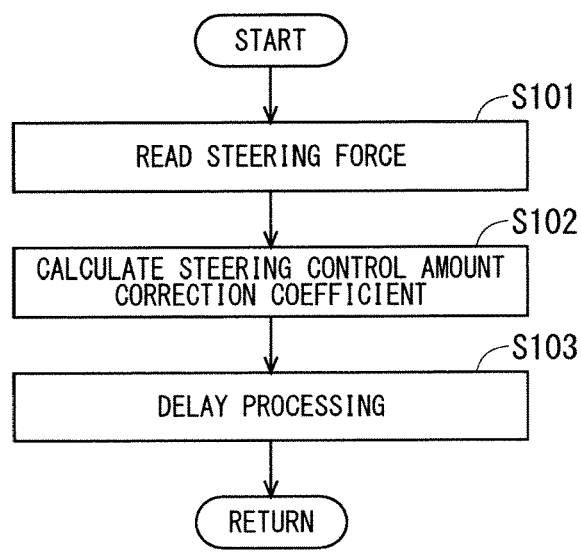
FIG. 3 is a flowchart for describing processing in a steering control amount correction coefficient calculator.

CPU 102 executes a variety of processing in accordance with the programs stored in the memory 103 to achieve the function of each block of the steering device 1. The I/F 101, the processor 102, and the memory 103 are bus-connected to each other. Returning to the description of FIG. 1, each functional block of the steering device 1 will further be described. FIG. 3 is a flowchart for describing the operation of the steering control amount correction coefficient calculator 10.

As illustrated in FIG. 3, the steering control amount correction coefficient calculator 10 reads the steering force detected by the steering force detector 3 (step S101), and calculates the steering control amount correction coefficient α (step S102). The steering control amount correction coefficient α here is a coefficient in a range of 0 to 1, for example, and when α=1, the steering control amount for lane keeping is in a state of 100%, which is the target traveling line following control state. When α=0, the steering control amount for lane keeping is in a state of 0%, which is a manual steering state by the driver. When 0<α<1, the steering control amount for lane keeping is in a state of α×100 (%), which is a transition state between the target traveling line following control state and the manual steering state.

As a method of calculating the steering control amount correction coefficient α, a map or a table showing the relationship between the absolute value of the steering force and the steering control amount correction coefficient may be prepared beforehand, to perform the calculation based on the read steering force by using the map or the table, or the steering control amount correction coefficient may be calculated based on an increase/decrease amount of the steering control amount correction coefficient with the lapse of time.

Using the map or the table leads to an advantage that the steering control amount correction coefficient a can be easily decided.

Next, for preventing an abrupt increase in the control amount immediately after completion of the override, the delay processing is executed on the steering control amount (step S103), and then the processing returns to the processing in step 101.

The first steering control amount calculator 11 calculates a target vehicle state quantity Ptg for approaching the target traveling line, and outputs the target vehicle state quantity Ptg as a first steering control amount to the second steering control amount calculator 12.

Herein, the target vehicle state quantity Ptg is any one of a target torque Ttg, a target steering angle θtg, a target yaw rate γtg, a target lateral acceleration Gtg, and a target road surface reaction force Trtg, or a combination thereof.

Concerning calculation methods for the target steering angle θtg, the target yaw rate γtg, the target lateral acceleration Gtg, and the target road surface reaction force Trtg, detailed descriptions thereof are omitted since the methods are known in the technique of assisting steering of the steering wheel or performing automatic steering such that the vehicle travels following a desired target traveling line, and are disclosed in, for example, Japanese Patent No. 6,012,824. The respective methods are expressed by the following mathematical expressions (1) to (4).

$$\theta_{tg} = k1 \cdot yLd + k2 \cdot eLd - k3 \cdot \gamma_s \quad (1)$$

where

θtg: target steering angle (target vehicle state quantity)
k1 to k3: coefficients
yLd: lateral displacement at forward gaze point distance
eLd: target traveling line inclination at forward gaze point distance
γs: yaw rate $$\gamma_{tg} = \frac{1}{1 + A \cdot V_s^2} \cdot \frac{V_s}{L} \cdot \theta_{tg} \quad (2)$$

$$G_{tg} = \frac{1}{1 + A \cdot V_s^2} \cdot \frac{V_s^2}{L} \cdot \theta_{tg} \quad (3)$$

$$T_{rtg} = K_{align} \cdot \theta_{tg} \quad (4)$$

where

A: stability factor
L: wheel base [m]
Vs: vehicle speed signal [m/s]
Kalign: a standard road surface reaction force gradient, which is a "ratio of a steering angle and road surface reaction force" in a linear region of tire characteristic.

The stability factor A is a characteristic value indicating a steering characteristic of the vehicle in steady circular turning at a constant steering wheel angle, and is a constant A in the relationship of $R/R0=1+AV^2$ when a turning radius of the center of gravity position is R, a turning radius at extremely low speed is R0, and the vehicle speed is V. When A is positive, the steering state is understeer, when A is zero, the steering state is neutral steer, and when A is negative, the steering state is oversteer.

The second steering control amount calculator 12 multiplies the steering control amount correction coefficient α input from the steering control amount correction coefficient calculator 10 with the first steering control amount input from the first steering control amount calculator 11 to calculate the second steering control amount, whereby it is possible to obtain the steering control amount with the corrected target vehicle state quantity Ptg, and obtain the steering control amount that does not abruptly increase even immediately after completion of the override.

Examples of the steering control method include control for the target torque Ttg and feedforward control (proportional control) of calculating turning power based on the target vehicle state quantity Ptg (the target steering angle θtg, the target yaw rate γtg, the target lateral acceleration Gtg, the target road surface reaction force Trtg).

The feedforward control type steering power Ttg_FF is expressed by the following mathematical expressions (5) to (8). That is, when the target steering angle θtg is used as the target vehicle state quantity Ptg, Ttg_FF is expressed by the mathematical expression (5). When the target yaw rate γtg is used, Ttg_FF is expressed by the mathematical expression (6). When the target lateral acceleration Gtg is used, Ttg_FF is expressed by the mathematical expression (7). When the target road surface reaction force Trtg is used, Ttg_FF is expressed by the mathematical expression (8).

$$T_{tg\_FF} = K_{align} \cdot \theta_{tg} \quad (5)$$

$$T_{tg\_FF} = K_{align} \cdot (1 + A \cdot V_s^2) \frac{L}{V_s} \cdot \gamma_{tg} \quad (6)$$

$$T_{tg\_FF} = K_{align} \cdot (1 + A \cdot V_s^2) \frac{L}{V_s^2} \cdot G_{tg} \quad (7)$$

$$T_{tg\_FF} = T_{rtg} \quad (8)$$

When the target steering angle θtg and the target road surface reaction force Trtg are used as the target vehicle state quantity Ptg, the steering performance is improved, and when the target yaw rate γtg and the target lateral acceleration Gtg are used, the vehicle behavior is stabilized.

As the steering actuator 20, for example, an electric motor or a hydraulic motor of the electric power steering can be used, the type of the motor is not particularly limited, and a DC motor and an AC motor can be used.

<Calculation of Steering Control Amount Correction Coefficient Using Map>

Figure 4:
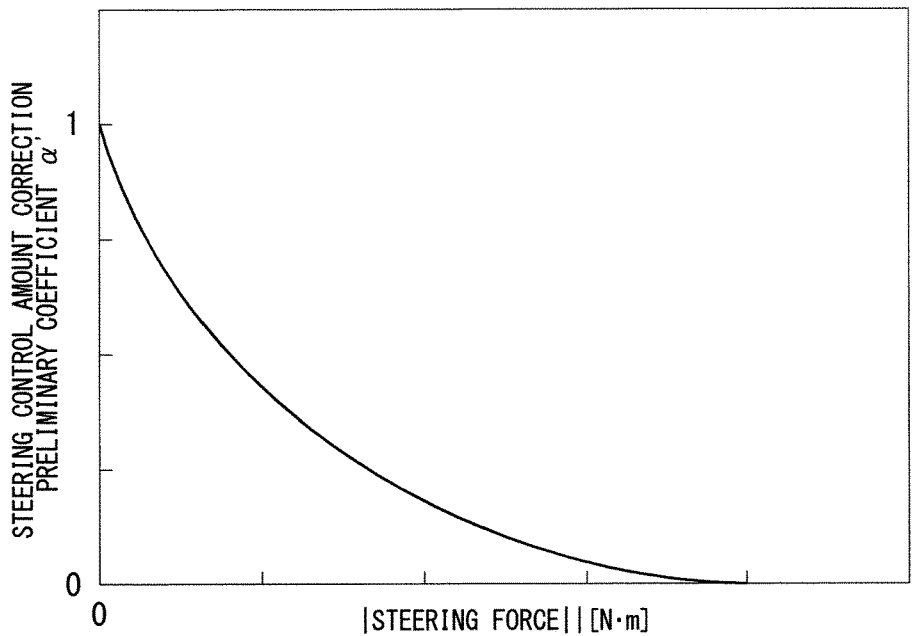
FIG. 4 is a diagram illustrating the relationship between an absolute value of steering force and a steering control amount correction preliminary coefficient.

Next, a description will be given of the operation of calculating a steering control amount correction coefficient by using the map in the steering control amount correction coefficient calculator 10. The steering control amount correction coefficient calculator 10 calculates a steering control amount correction coefficient based on a map as illustrated in FIG. 4, for example. Note that the coefficient calculated herein is referred to as a steering control amount correction preliminary coefficient α'.

FIG. 4 is an example of a map illustrating, in a graph, the relationship between the steering control amount correction preliminary coefficient α' with respect to an absolute value [N·m] of steering force, which represents the following characteristics: α'=1 when the absolute value of the steering force is zero, the steering control amount correction preliminary coefficient α' decreases as the absolute value of the steering force increases, and eventually, α'=0. That is, α'=1 when the driver does not steer the steering input unit 2, and the steering control amount for lane keeping is in a state of 100%, which is the target traveling line following control state. When α'=0, the steering control amount for lane keeping is in a state of 0%, which is the manual steering state by the driver. When 0<α'<1, the steering control amount for lane keeping is in a state of α'×100 (%), which is a transition state between the target traveling line following control state and the manual steering state.

However, in the control using the steering control amount correction preliminary coefficient α' as described above, the control amount abruptly increases after the decrease in the control amount due to the driver's steering intervention and immediately after completion of the steering intervention, that is, immediately after completion of the override, and thus smooth control-switching may not be made.

Figure 5:
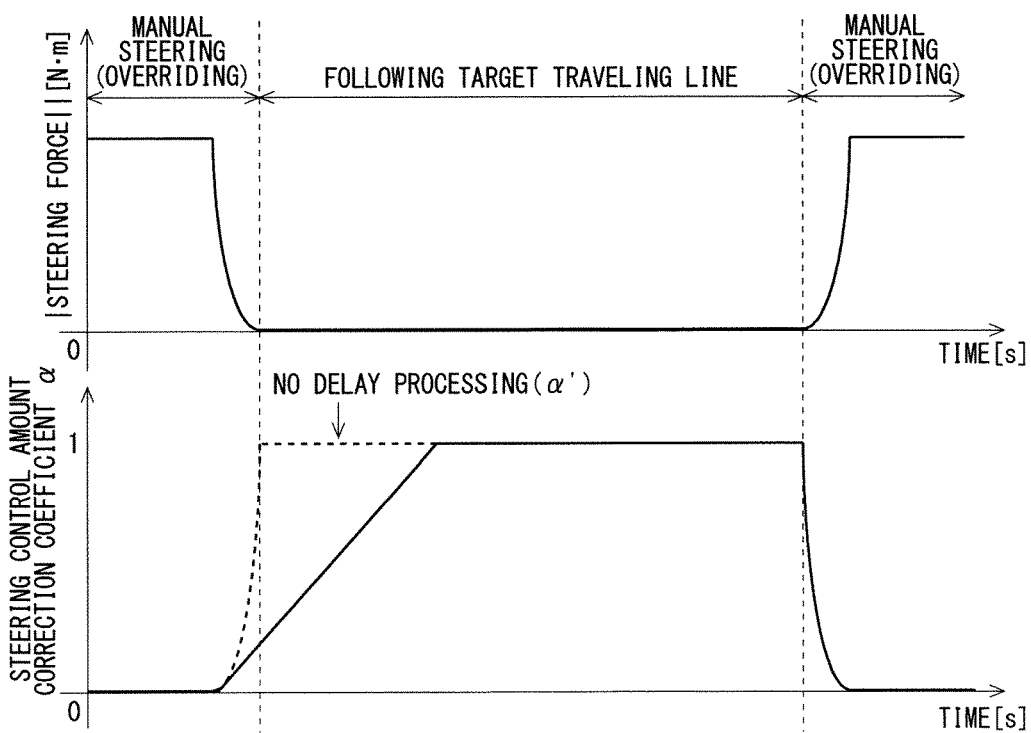
FIG. 5 is a diagram illustrating a time change in a steering control amount correction coefficient, obtained by performing delay processing on the steering control amount correction preliminary coefficient, and a time change in the absolute value of the steering force.

Hence, in the present preferred embodiment, the steering control amount correction coefficient calculator 10 is configured to perform delay processing. FIG. 5 is a diagram illustrating a time change in the steering control amount correction coefficient a obtained by performing the delay processing on the steering control amount correction preliminary coefficient α' calculated based on the map illustrated in FIG. 4 and a time change in the absolute value of the steering force. The time change in the steering force (absolute value) is illustrated on the upper side of FIG. 5, and the time change in the steering control amount correction coefficient a is illustrated on the lower side of FIG. 5.

As illustrated in FIG. 5, although the steering force (absolute value) abruptly decreases during the override by the driver, and in contrast, the steering control amount correction preliminary coefficient α' abruptly increases as indicated by a broken line on the lower side of FIG. 5, by taking a coefficient obtained by performing the delay processing on the steering control amount correction preliminary coefficient α' as the steering control amount correction coefficient α, as indicated by a solid line on the lower side of FIG. 5, the time rate of change in the steering control amount correction coefficient α during the increase is smaller than the time rate of change in the steering control amount correction coefficient α during the decrease, and it is possible to smoothly return the state to the target traveling line following control state.

Here, the delay processing performed by the steering control amount correction coefficient calculator 10 includes low-pass filter processing, moving average processing, and rate limiter processing, for example.

Figure 6:
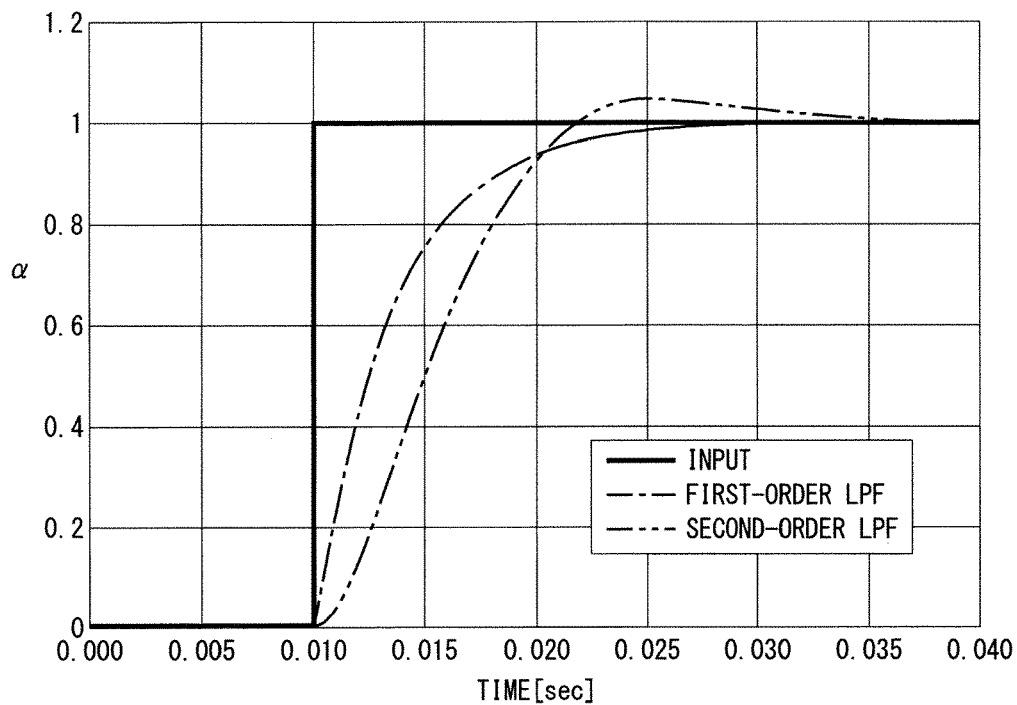
FIG. 6 is a diagram for describing the delay processing by low-pass filter processing.

FIG. 6 is a diagram for describing the delay processing by the low-pass filter processing, in which the horizontal axis represents the time (sec) and the vertical axis represents the steering control amount correction coefficient α. Passing an input of an abrupt waveform through a first-order low-pass filter (first-order LPF) or a second-order low-pass filter (second-order LPF) in this manner can remove a high frequency component and obtain a waveform that smoothly increases with elapse of time.

Figure 7:
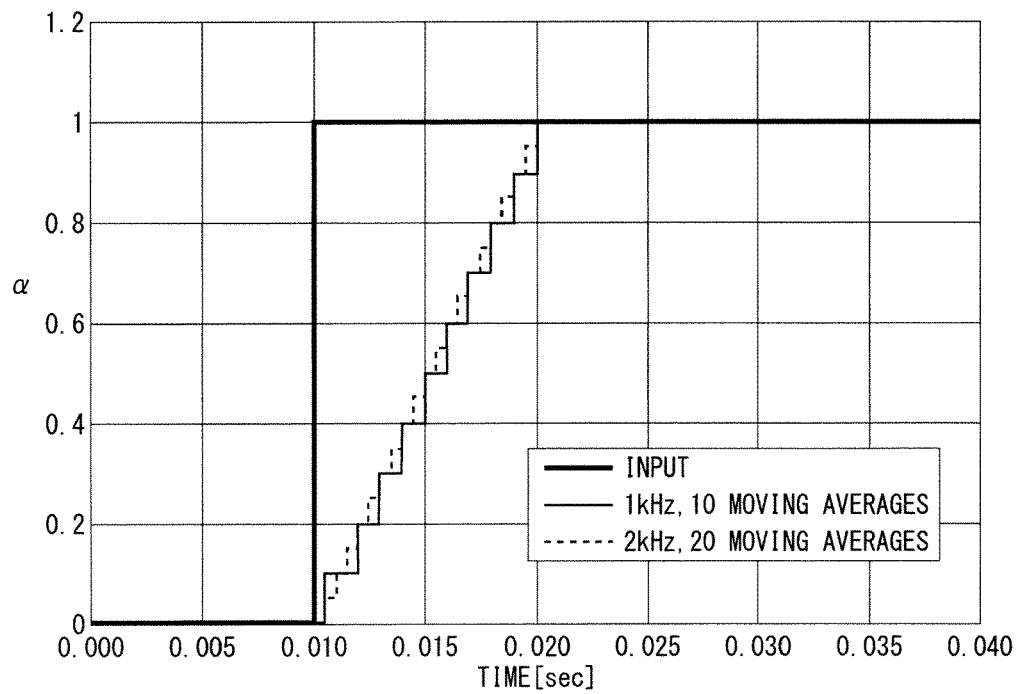
FIG. 7 is a diagram for describing the delay processing by moving average processing.

FIG. 7 is a diagram for describing the delay processing by the moving average processing, in which the horizontal axis represents the time (sec) and the vertical axis represents the steering control amount correction coefficient α. By setting a certain interval (period) for an abrupt waveform input and taking an average while shifting the range in this manner, the influence of regular fluctuating elements and irregular fluctuating elements is eliminated to make the shift "smooth", thus making it possible to eliminate the high frequency component and obtain a waveform which smoothly increases with the lapse of time.

FIG. 7 illustrates processing with 1 kHz to take ten moving averages in a period of 0.010 sec to 0.020 sec (0.01 sec), and processing with 2 kHz to take 20 moving averages, to obtain a waveform that changes more smoothly as a frequency becomes higher.

FIG. 8 is a diagram for describing the delay processing by the rate limiter processing, and by limiting the change rate (inclination) of the signal, it possible to obtain a waveform that smoothly changes an input of an abrupt waveform.

In FIG. 8, the horizontal axis represents the time (sec) and the vertical axis represents the steering control amount correction coefficient α. A waveform indicated by a broken line is a waveform when the rate limiter processing is not performed, while a waveform indicated by a one-dot chain line is a waveform when the rate limiter processing is performed, and as a result of performing the rate limiter processing, the inclination is limited.

<calculation Based on Increase/Decrease Amount of Steering Control Amount Correction Coefficient with Lapse of Time>

Next, a description will be given of the operation of calculating the steering control amount correction coefficient in the steering control amount correction coefficient calculator 10 based on an increase/decrease amount of the steering control amount correction coefficient with the lapse of time. Note that the coefficient calculated herein is referred to as a steering control amount correction preliminary coefficient α'.

In this calculation, for example, as illustrated in FIG. 9, when the absolute value of the steering force is equal to or larger than a predetermined set value, the steering control amount correction preliminary coefficient α' is decreased at a constant decrease rate, and when the absolute value of the steering force is smaller than the set value, the steering control amount correction preliminary coefficient α' is increased at a constant increase rate.

Here, when it is assumed that the constant increase/decrease rate is C, the steering control amount correction preliminary coefficient α' due to the lapse of time can be expressed by the following mathematical expression (9).

$$\alpha' = \alpha' + C \qquad (9)$$

When the absolute value of the steering force is equal to or larger than the set value, the increase/decrease rate C is set to a negative value (e.g., −0.1), and the steering control amount correction preliminary coefficient α' is decreased. On the other hand, when the absolute value of the steering force is smaller than the set value, the increase/decrease rate C is set to a positive value (e.g., +0.1), and the steering control amount correction preliminary coefficient α' is increased. Here, it is assumed that the steering control amount correction preliminary coefficient α' is a coefficient in a range of 0 to 1, which is calculated so as not to be out of the range by being fixed to 0 when reaching the minimum value 0, and fixed to 1 when reaching the maximum value 1.

Thereby, simply setting the increase/decrease rate beforehand leads to an advantage that the steering control amount correction coefficient can be uniquely set.

However, in the control using the steering control amount correction preliminary coefficient α' as described above, the control amount abruptly increases after the decrease in the control amount due to the driver's steering intervention and immediately after completion of the steering intervention, that is, immediately after completion of the override, and thus smooth control-switching may not be made.

Hence, in the present preferred embodiment, the steering control amount correction coefficient calculator 10 is configured to perform delay processing. FIG. 10 is a graph illustrating the relationship between a time change in the steering control amount correction coefficient α, obtained by performing the delay processing on the steering control amount correction preliminary coefficient α' calculated based on an increase/decrease rate of the steering control amount correction coefficient with the lapse of time, and a time change in the absolute value of the steering force. The time change in the steering force (absolute value) is illustrated on the upper side of FIG. 10, and the time change in the steering control amount correction coefficient α is illustrated on the lower side of FIG. 10.

As illustrated in FIG. 10, although the steering force (absolute value) abruptly decreases during the override by the driver, and in contrast, the steering control amount correction preliminary coefficient α' abruptly increases as indicated by a broken line on the lower side of FIG. 10, by taking a coefficient obtained by performing the delay processing on the steering control amount correction preliminary coefficient α' as the steering control amount correction coefficient α, as indicated by a solid line on the lower side of FIG. 10, the time rate of change in the steering control amount correction coefficient α during the increase is smaller than the time rate of change in the steering control amount correction coefficient during the decrease, and it is possible to smoothly return the state to the target traveling line following control state.

Note that the delay processing performed by the steering control amount correction coefficient calculator 10 includes low-pass filter processing, moving average processing, and rate limiter processing, for example.

In addition to the delay processing, a coefficient may be taken as the steering control amount correction coefficient α, which is obtained such that the time rate of change in the steering control amount correction preliminary coefficient α' during the increase is smaller than the time rate of change in the steering control amount correction preliminary coefficient α' during the decrease for a predetermined set time after completion of the override (after the steering force becomes almost zero). Hence, the time rate of change in the steering control amount correction coefficient α during the increase is smaller than the time rate of change in the steering control amount correction coefficient during the decrease, and it is possible to smoothly return the state to the target traveling line following control state.

In order to change the time rate of change in the steering control amount correction preliminary coefficient α' during the increase for the set time, the increase/decrease rate C in the mathematical expression (9) is changed from +0.1 to +0.02, for example, for the set time.

Here, based on a steering state quantity, namely, a state quantity (a steering angular speed, a steering force change amount, and a steering force absolute value) accompanying the rotation of the steering wheel, it is possible to determine that the driver is starting the override or continuing the override.

Thus, when the steering state quantity exceeds a predetermined threshold, a coefficient is taken as the steering control amount correction coefficient α, which is obtained such that the time rate of change in the steering control amount correction preliminary coefficient α' during the increase is smaller than the time rate of change in the steering control amount correction preliminary coefficient α' during the decrease, whereby the time rate of change in the steering control amount correction coefficient α during the increase is smaller than the time rate of change in the steering control amount correction coefficient during the decrease, and it is thus possible to smoothly return the state to the target traveling line following control state. When the steering state quantity becomes equal to or smaller than the predetermined threshold, the time rate of change during the increase is restored to the original value. Using the steering state quantity to set the steering control amount correction coefficient allows more sensitive operation.

In order to reduce the time rate of change in the steering control amount correction preliminary coefficient α' during the increase, the increase/decrease rate C in the mathematical expression (9) is changed from +0.1 to +0.02, for example, for the set time to achieve the reduction in the time rate of change.

<Modification>

Figure 11:
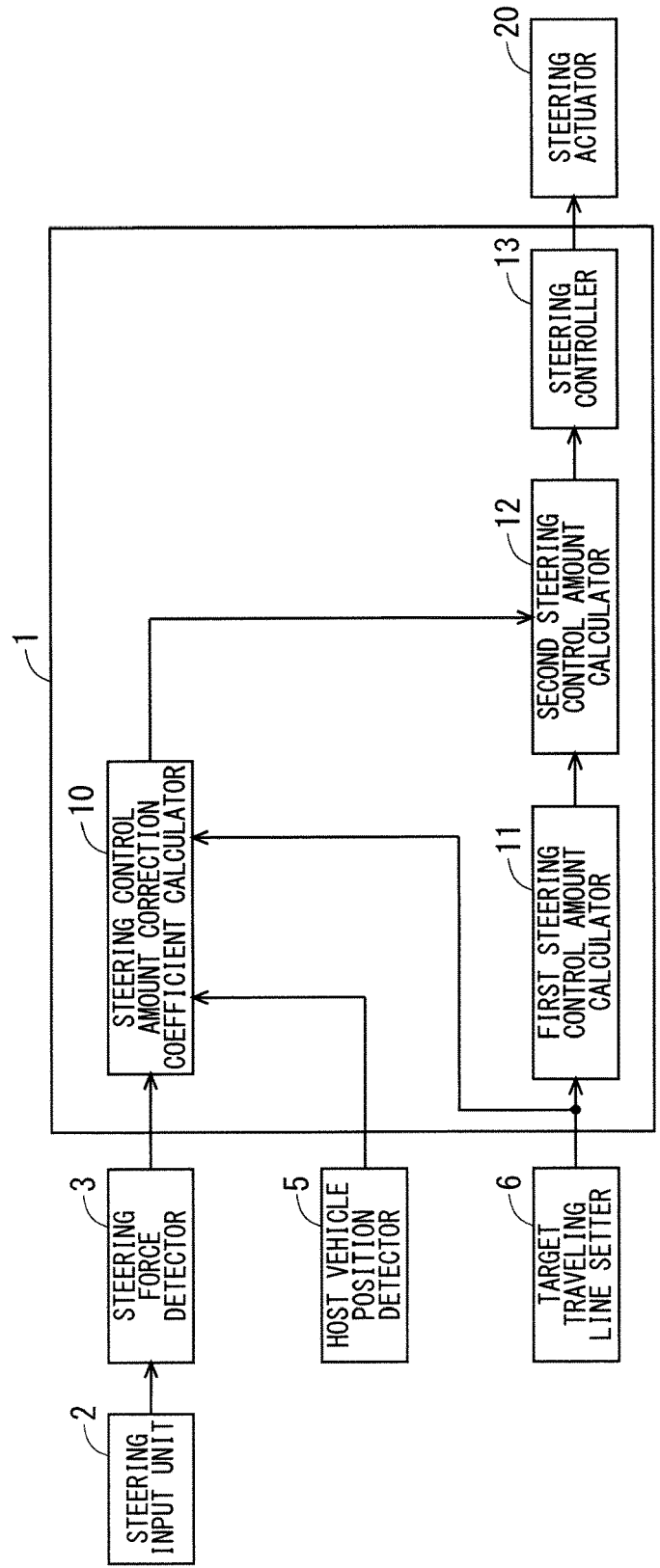
FIG. 11 is a functional block diagram illustrating a configuration of a vehicle steering system according to a modification of the first preferred embodiment of the present invention.

FIG. 11 is a functional block diagram illustrating a configuration of a vehicle steering system 100A according to a modification of the first preferred embodiment. As illustrated in FIG. 11, the vehicle steering system 100A further includes, in the vehicle steering system 100 of the first preferred embodiment, a subject vehicle position detector 5 that detects the position of the subject vehicle, and a target traveling line setter 6 that sets a target traveling line for the vehicle to travel following a traveling road. Then, the information on the subject vehicle position and the target traveling line are input into the steering control amount correction coefficient calculator 10, to calculate the time rate of change in the steering control amount correction preliminary coefficient α' in accordance with the distance between the subject vehicle position and the target traveling line.

That is, the information on the subject vehicle position detected by the subject vehicle position detector 5 is input into the steering control amount correction coefficient calculator 10, and the information on the target traveling line set by the target traveling line setter 6 is input into the steering control amount correction coefficient calculator 10 and the first steering control amount calculator 11.

The subject vehicle position detector 5 is configured by a detector for position information (the position information is included in vehicle information) mounted in the subject vehicle, and as the detector, for example, there can be used a detector that receives (detects) the position information of the subject vehicle from a satellite positioning system such as a quasi-zenith satellite and a GPS (Global Positioning System) satellite.

The target traveling line setter 6 is a device for setting the target traveling line, which is a target at the time of making the vehicle travel following the traveling road, in the traveling road based on traveling road information (the traveling road information is included in the vehicle information), and for example, it is possible to set the target traveling line at a position away from the right-side boundary line by a prescribed distance (e.g., ½ of the traveling road width). Note that the driver can arbitrarily set the prescribed distance.

Figure 12:
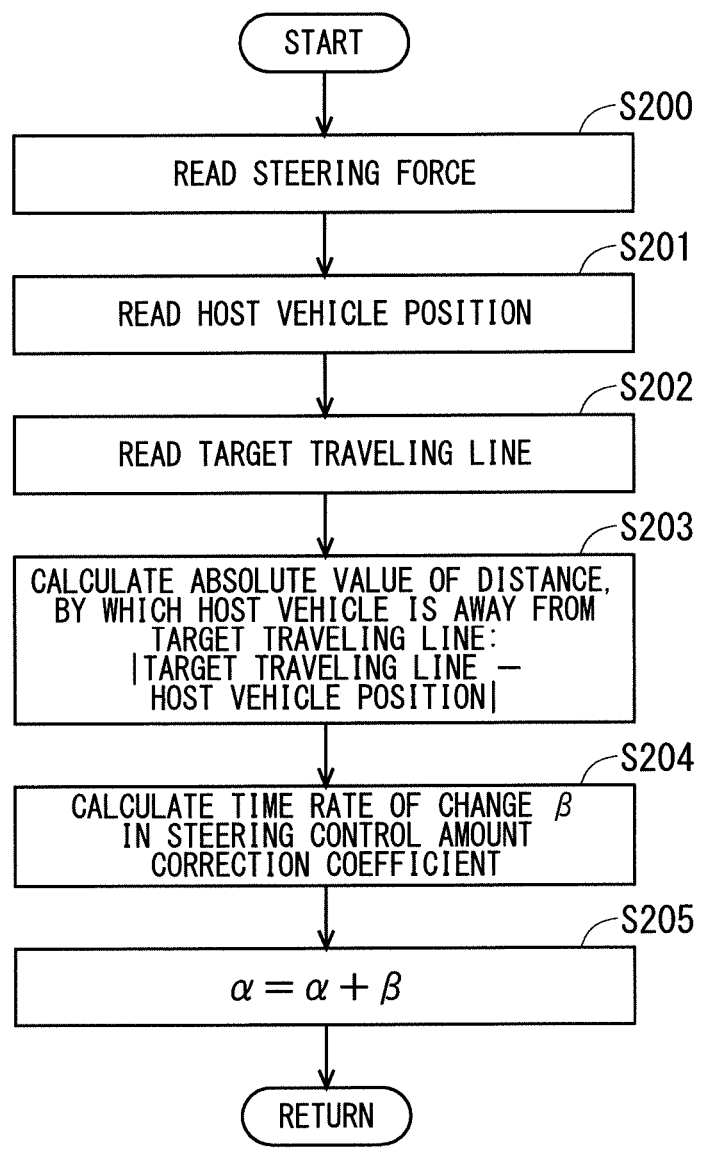
FIG. 12 is a flowchart for describing processing in a steering control amount correction coefficient calculator.

FIG. 12 is a flowchart for describing the operation of the steering control amount correction coefficient calculator 10. As illustrated in FIG. 12, the steering control amount correction coefficient calculator 10 reads steering force detected by the steering force detector 3 (step S200), and reads the subject vehicle position from the subject vehicle position detector 5 (step S201), reads a target traveling line from the target traveling line setter 6 (step S202), and calculates an absolute value (|target traveling line−subject vehicle position|) of a distance, by which the subject vehicle is away from the target traveling line (step S203).

Based on the absolute value of the distance, by which the subject vehicle is away from the target traveling line, a time rate of change β in the steering control amount correction coefficient is calculated such that the time rate of change is smaller as the absolute value of the distance is smaller (as the subject vehicle position is closer to the target traveling line), and the time rate of change is larger as the absolute value of the distance is larger (as the subject vehicle position is farther from the target traveling line) (step S204).

Figure 13:
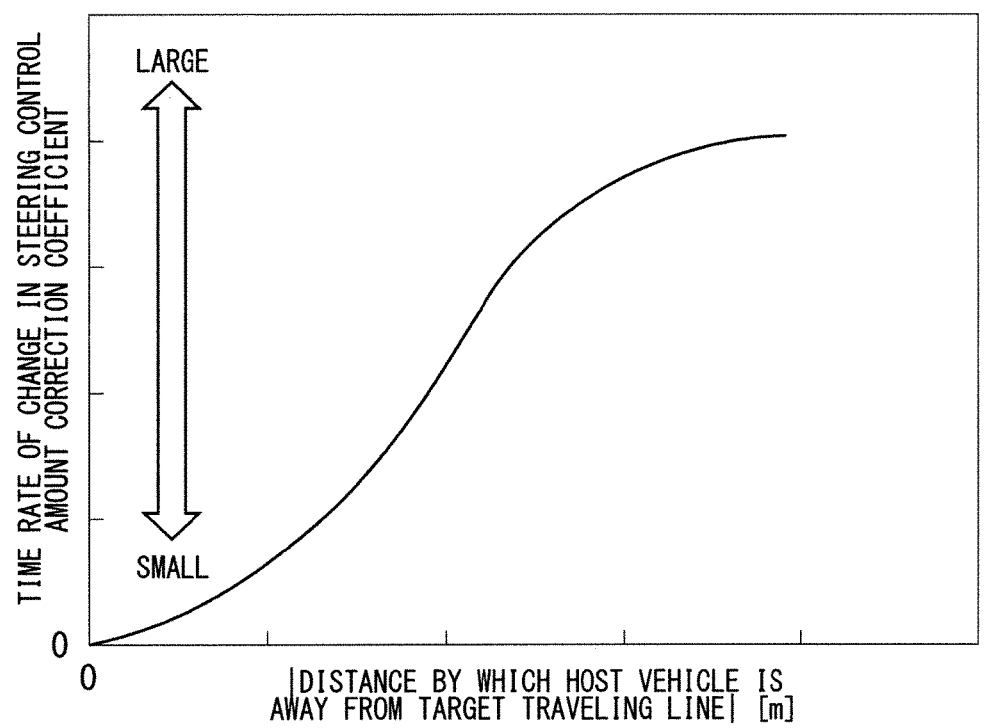
FIG. 13 is a diagram illustrating the relationship between an absolute value of a distance, by which a subject vehicle is away from the target traveling line, and the time rate of change in the steering control amount correction coefficient.

More specifically, for example, the time rate of change β in the steering control amount correction coefficient is calculated based on a map as illustrated in FIG. 13. FIG. 13 is an example of a map illustrating, in a graph, the relationship between the absolute value [m] of the distance, by which the subject vehicle is away from the target traveling line, and the time rate of change β in the steering control amount correction coefficient, and when the absolute value of the distance, by which the subject vehicle is away from the target traveling line is zero, β=0, and the time rate of change β in the steering control amount correction coefficient increases as the absolute value of the distance increases. Note that the curve of the map is not limited to the curve illustrated in the figure, and any curve can be arbitrarily set.

Next, the steering control amount correction coefficient calculator 10 calculates the steering control amount correction coefficient α (step S205). Here, the steering control amount correction coefficient α is calculated by adding the time rate of change β in the steering control amount correction coefficient to an initial value of the steering control amount correction coefficient α (α+β). Note that the initial value of the steering control amount correction coefficient α may be obtained from the absolute value [N·m] of the steering force by using the map illustrated in FIG. 4, and there is no limitation on the method for obtaining the absolute value. After calculation of the steering control amount correction coefficient, the processing returns to step S200.

In the vehicle steering system 100A according to the modification of the first preferred embodiment described above, by setting the steering control amount correction coefficient α to a value obtained by considering the time rate of change β in the steering control amount correction coefficient, as the subject vehicle comes closer to the target traveling line, the time rate of change in the steering control amount correction coefficient α during the increase is smaller than the time rate of change in the steering control amount correction coefficient during the decrease, and it is possible to smoothly return the state to the target traveling line following control state. The time rate of change in the steering control amount correction coefficient α during the increase is larger as the vehicle position is farther from the target traveling line, and when the subject vehicle greatly deviates from the target traveling line, it can promptly return to the target traveling line, and the steering control can thus be made in accordance with the traveling state of the subject vehicle.

As described above, according to the vehicle steering devices 100 and 100A of the first preferred embodiment, even after the decrease in the control amount due to the driver's steering intervention and immediately after completion of the steering intervention, that is, immediately after completion of the override, the control amount does not abruptly increase and it is thus possible to smoothly return the state to the target traveling line following control state.

<Second Preferred Embodiment>

Figure 14:
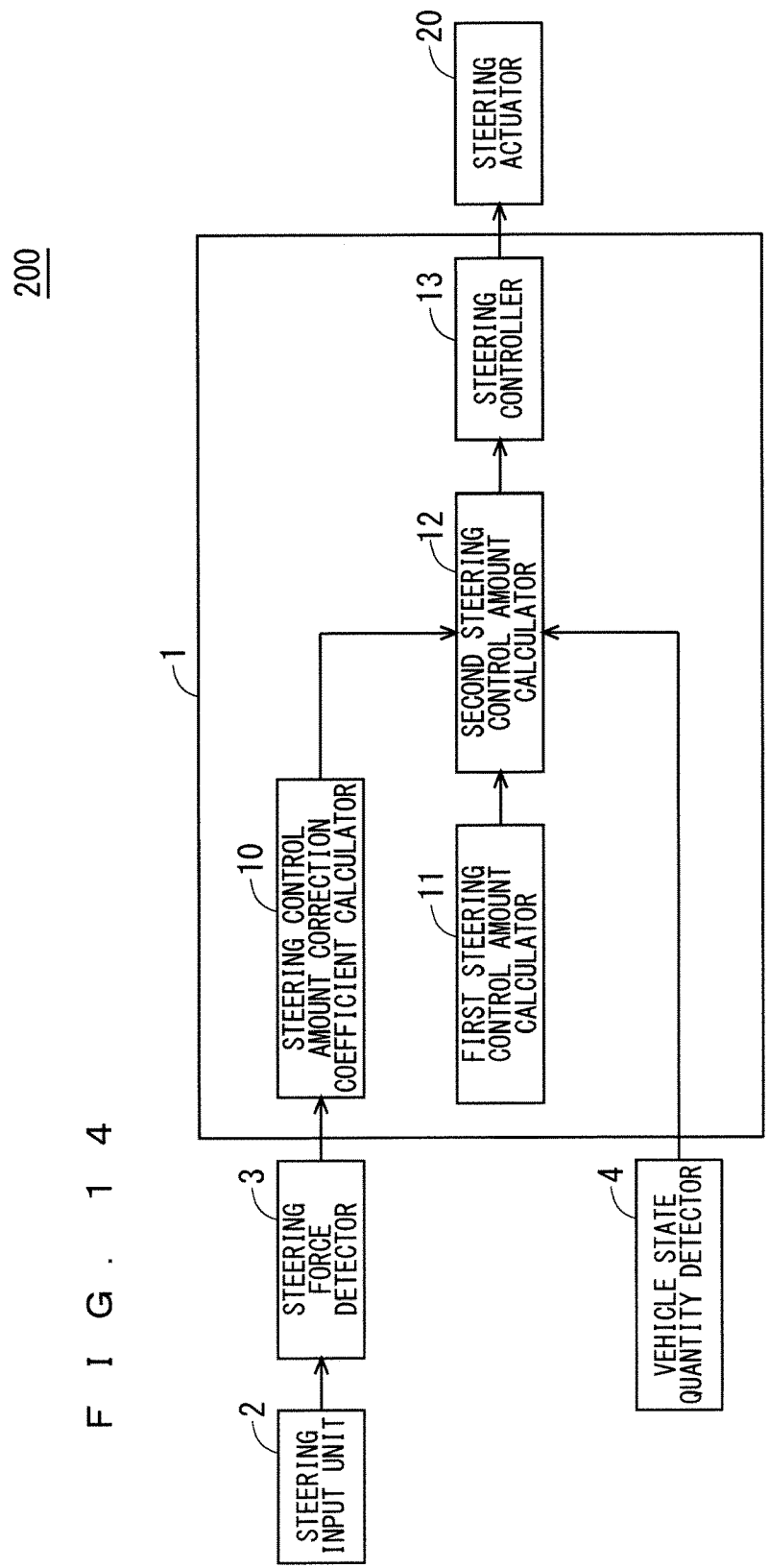
FIG. 14 is a functional block diagram illustrating a vehicle steering system according to a second preferred embodiment of the present invention.

FIG. 14 is a functional block diagram illustrating a configuration of a vehicle steering system 200 according to a second preferred embodiment of the present invention. As illustrated in FIG. 14, the vehicle steering system 200 further includes, in the vehicle steering system 100 of the first preferred embodiment, a vehicle state quantity detector 4 for detecting the vehicle state quantity of the subject vehicle. The detection result by the vehicle state quantity detector 4 is input into the second steering control amount calculator 12.

The vehicle state quantity detector 4 detects the vehicle state quantity of the subject vehicle. Examples of the vehicle state quantity include a steering angle, a yaw rate, a lateral acceleration, and a road surface reaction torque, but the vehicle state quantity is not limited thereto. In the vehicle steering system 100 of the first preferred embodiment, the first steering control amount calculator 11 calculates the vehicle state quantity of the subject vehicle so as to calculate the target vehicle state quantity Ptg for approaching the target traveling line. However, since it is not new to provide the vehicle state quantity detector in the vehicle, the illustration of the vehicle state quantity detector is omitted in FIG. 1. In the vehicle steering system 200 of the second preferred embodiment, since it is new to use the vehicle state quantity for calculation of the second steering control amount, the vehicle state quantity detector 4 is illustrated.

Also in the vehicle steering system 200 of the second preferred embodiment, the second steering control amount calculator 12 calculates the second steering control amount, but a calculation method is different from that in the first preferred embodiment. That is, in the second steering control amount calculator 12 of the second preferred embodiment, the steering control amount correction coefficient α is treated as a ratio value, and a first value made up of a feedback term obtained by multiplying the steering control amount correction coefficient α (proportion) with the first steering control amount is added to a second value made up of a feedforward term obtained by multiplying a value of the remaining ratio (1−α) with the vehicle state quantity, to calculate a second steering control amount for steering the subject vehicle to follow the target traveling line, and the second steering control amount is output to the steering controller 13.

For example, when the first steering control amount is $θ_1$, the second steering control amount is $θ_2$, and the vehicle state quantity is θ, the second steering control amount $θ_2$ can be expressed by the following mathematical expression (10).

$$θ_2=αθ_1+(1−α)θ \quad (10)$$

In the second preferred embodiment, calculating the second steering control amount using the mathematical expression (10) prevents accumulation of deviation due to integration even when the steering control amount correction coefficient α becomes zero (the manual steering state by the driver). Here, the deviation due to integration is deviation accumulated by feedback control (integral control). The deviation is also generated by feedforward control (proportional control), but the deviation is not accumulated by the proportional control alone but the deviation is accumulated by the feedback control.

In the mathematical expression (10), a term obtained by multiplying the steering control amount correction coefficient α with the first steering control amount is taken as the feedback term, and the feedback control is performed so as to eliminate the deviation amount from the target vehicle state quantity Ptg, thereby increasing the accuracy in following the target traveling line and assisting the driver's steering to allow natural and stable lane keeping control along the target vehicle state quantity Ptg.

Further, in the mathematical expression (10), it is assumed that the interference frequency with the driver is small since the variation frequency of the vehicle state quantity is small, and a term obtained by multiplying the remaining steering control amount correction coefficient (1−α) with the vehicle state quantity is taken as the feedforward term, to perform the feedforward control.

When the steering control amount correction coefficient α is zero (the manual steering state by the driver), that is, when α=0 is substituted into the mathematical expression (10), $\theta_2 = \theta$, and the second steering control amount is the vehicle state quantity θ alone. Since the vehicle state quantity θ is a sensor value such as the steering angle, the yaw rate, the lateral acceleration, or the road surface reaction torque, it is irrelevant to integration or deviation. Further, the feedforward control has a feature that the interference frequency with the driver is small because the frequency of variation in the vehicle state quantity is small.

As described above, in the vehicle steering system 200 of the second preferred embodiment, by calculation of the second steering control amount using the mathematical expression (10), even when the steering control amount correction coefficient α is zero, that is, even when the state becomes the manual steering state by the driver, it possible to prevent accumulation of deviation due to integration, and even after a decrease in the control amount due to the driver's steering intervention and immediately after completion of the steering intervention, that is, immediately after completion of the override, the control amount does not abruptly increase and it is thus possible to smoothly return the state to the target traveling line following control state.

Further, in the mathematical expression (10), by performing the feedback control so as to eliminate a deviation amount from the target vehicle state quantity Ptg, the accuracy in following the target traveling line is increased and steering of the driver is assisted, to allow natural and stable lane keeping control.

<Application Example to Lane Keeping System>

Figure 15:
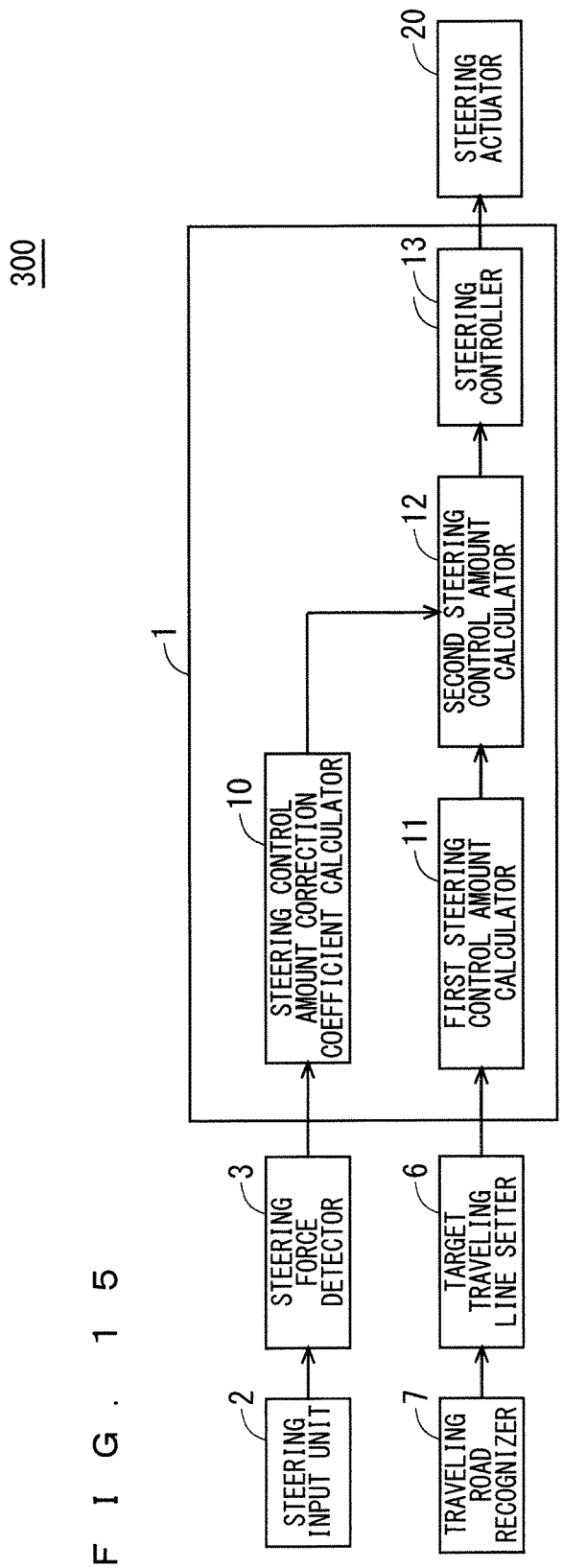
FIG. 15 is a functional block diagram illustrating a lane keeping system, to which the vehicle steering system according to the present invention has been applied.

The vehicle steering system according to the first and second preferred embodiments described above can be applied to a lane keeping system. FIG. 15 is a functional block diagram illustrating a configuration of a lane keeping system 300 to which the vehicle steering system 100 of the first preferred embodiment is applied. As illustrated in FIG. 15, the lane keeping system 300 further includes, in the vehicle steering system 100 of the first preferred embodiment, a target traveling line setter 6 that sets a target traveling line for a vehicle to travel following a traveling road, and a traveling road recognizer 7 that recognizes the traveling road on which the vehicle travels, and the recognition result by the traveling road recognizer 7 is input into the target traveling line setter 6.

The traveling road recognizer 7 detects right and left white lines of the subject vehicle based on a video signal output from a device that captures a forward image, such as a digital camera, in order to recognize the traveling road. Further, the traveling road recognizer 7 calculates a traveling road recognition rate which is the reliability of the detected white line. A typical method for detecting the left and right white lines is to acquire an image ahead of the subject vehicle from the input video signal, perform binary image processing and edge detection processing, detect the left and right white lines of the subject vehicle by Hough transform or the like, detect the relative position of the left and right white lines with respect to the subject vehicle, and use this as the forward traveling road information. Although a variety of methods for detecting the white line on the road surface have been proposed other than the above, even when the left and right white lines are detected using any method, it does not affect the effect of the present invention.

Based on the relative positions of the left and right white lines with respect to the subject vehicle recognized by the traveling road recognizer 7, the target traveling line setter 6 sets a target traveling line, which is a target at the time of making the vehicle travel following the traveling road, in the traveling road and inputs information of the target traveling line into the first steering control amount calculator 11. The first steering control amount calculator 11 calculates the target vehicle state quantity Ptg for approaching the target traveling line and outputs the target vehicle state quantity Ptg to the second steering control amount calculator 12 as the first steering control amount. The subsequent processing is the same as the processing in the first preferred embodiment, and hence a description thereof is omitted.

As described above, by applying the vehicle steering system 100 of the first preferred embodiment to the lane keeping system, even after the decrease in the control amount due to the driver's steering intervention and immediately after completion of the steering intervention, that is, immediately after completion of the override, the control amount does not abruptly increase, and it is thus possible to smoothly return the state to the target traveling line following control state.

In the present invention, each preferred embodiment can be freely combined within the scope of the invention, and each preferred embodiment can be modified or omitted as appropriate.

While the invention has been shown and described in detail, the foregoing description is in all aspects illustrative and not restrictive. It is therefore understood that numerous modifications and variations can be devised without departing from the scope of the invention.

What is claimed is:

1. A vehicle steering system for assisting steering operation such that a vehicle travels following a target traveling line, the vehicle steering system comprising:
    a steering input unit that is steered by a driver;
    a steering force detector to detect steering force input into said steering input unit;
    a first steering control amount calculator to calculate a first steering control amount for bringing said vehicle close to said target traveling line;
    a steering control amount correction coefficient calculator that calculates a steering control amount correction coefficient for correcting a steering control amount based on said steering force;
    a second steering control amount calculator that calculates a second steering control amount based on said first steering control amount and said steering control amount correction coefficient; and
    a steering controller to steer and control said vehicle based on said second steering control amount,
    wherein said steering control amount correction coefficient calculator sets said steering control amount correction coefficient to a coefficient that decreases with increase in said steering force and increases with decrease in said steering force, and calculates said steering control amount correction coefficient such that a time rate of change in said steering control amount correction coefficient during the increase is smaller than a time rate of change during the decrease.

2. The vehicle steering system according to claim 1, wherein said second steering control amount calculator calculates said second steering control amount by multiplying said first steering control amount with said steering control amount correction coefficient.

3. The vehicle steering system according to claim 1, comprising
a vehicle state quantity detector to detect a vehicle state quantity of said vehicle,
wherein said vehicle state quantity detected by said vehicle state quantity detector is input into said second steering control amount calculator, and
said second steering control amount calculator treats said steering control amount correction coefficient as a ratio value and adds a first value, obtained by multiplying said first steering control amount with said ratio value, and a second value, obtained by multiplying said vehicle state quantity with a remaining ratio value, to calculate said second steering control amount.

4. The vehicle steering system according to claim 1, wherein said steering control amount correction coefficient calculator calculates said steering control amount correction coefficient based on a map or a table in which a relationship of said steering control amount correction coefficient with respect to said steering force is predetermined.

5. The vehicle steering system according to claim 1, wherein said steering control amount correction coefficient calculator calculates said steering control amount correction coefficient such that said steering force decreases at a constant decrease rate when said steering force is equal to or larger than a predetermined set value and increases at a constant increase rate when said steering force is smaller than said set value.

6. The vehicle steering system according to claim 1, wherein said steering control amount correction coefficient calculator performs delay processing on said steering control amount correction coefficient that decreases with increase in said steering force and increases with decrease in said steering force, to make the time rate of change in said steering control amount correction coefficient during the increase smaller than the time rate of change during the decrease.

7. The vehicle steering system according to claim 6, wherein said delay processing includes low-pass filter processing or moving average processing.

8. The vehicle steering system according to claim 6, wherein said delay processing includes rate limiter processing.

9. The vehicle steering system according to claim 1, wherein said steering control amount correction coefficient calculator performs calculation such that the time rate of change in said steering control amount correction coefficient during the increase is smaller than the time rate of change during the decrease for a predetermined set time.

10. The vehicle steering system according to claim 1, wherein, when a steering state quantity of said driver exceeds a predetermined threshold, said steering control amount correction coefficient calculator performs calculation such that the time rate of change in said steering control amount correction coefficient during the increase is smaller than the time rate of change during the decrease.

11. The vehicle steering system according to claim 10, wherein said steering state quantity includes any of a steering angular speed, a steering force change amount, and a steering force absolute value.

12. The vehicle steering system according to claim 1, further comprising:
a subject vehicle position detector to detect a subject vehicle position; and
a target traveling line setter to set said target traveling line,
wherein upon receipt of information of said subject vehicle position and said target traveling line, said steering control amount correction coefficient calculator calculates said steering control amount correction coefficient such that the time rate of change in said steering control amount correction coefficient during the increase is smaller as said subject vehicle position is closer to said target traveling line, the time rate of change in said steering control amount correction coefficient during the increase is larger as said subject vehicle position is farther from said target traveling line.

13. A lane keeping system comprising:
the vehicle steering system according to claim 1;
a traveling road recognizer to recognize a traveling road on which said vehicle travels; and
a target traveling line setter to set said target traveling line,
wherein said target traveling line setter sets said target traveling line in said traveling road based on relative positions of left and right white lines with respect to said vehicle recognized by said traveling road recognizer, and
said steering controller performs steering control such that the vehicle travels following said target traveling line.

* * * * *